(12) United States Patent
Sanchez et al.

(10) Patent No.: US 7,513,358 B2
(45) Date of Patent: Apr. 7, 2009

(54) ROLLER CONVEYOR

(76) Inventors: Luis Sanchez, 4252 Warrington, NW., Walker, MI (US) 49544; Lawrence E. Forrester, 5645 Ramsdell NE., Rockford, MI (US) 49341

( * ) Notice: Subject to any disclaimer, the term of this patent is extended or adjusted under 35 U.S.C. 154(b) by 0 days.

(21) Appl. No.: 11/157,101

(22) Filed: Jun. 20, 2005

(65) Prior Publication Data

US 2006/0021847 A1    Feb. 2, 2006

Related U.S. Application Data

(60) Provisional application No. 60/580,948, filed on Jun. 18, 2004.

(51) Int. Cl.
*B65G 17/24* (2006.01)

(52) U.S. Cl. .................. 198/779; 198/778; 193/35 S

(58) Field of Classification Search .............. 198/778, 198/779; 193/35 S, 35 TE
See application file for complete search history.

(56) References Cited

U.S. PATENT DOCUMENTS 1,287,170 A * 12/1918 Younkman ............... 193/35 S
2,204,828 A * 6/1940 Sherrill .................... 193/35 S
4,351,429 A * 9/1982 Garvey ...................... 198/778
4,693,356 A * 9/1987 Pi-May ................... 193/35 TE

* cited by examiner

*Primary Examiner*—James R Bidwell
(74) *Attorney, Agent, or Firm*—John A. Waters; Flynn, Thiel, Boutell & Tanis, P.C.

(57) ABSTRACT

A non-powered roller conveyor for conveying parts along a conveyor path includes a downwardly sloped conveyor support frame with a plurality of rollers rotatably mounted along the frame. The rollers comprise a length of prefabricated roller top conveyor chain mounted along a top surface of the conveyor frame. The conveyor chain includes a plurality of links connected together by pivotal connectors that permit sideways articulation of the links with respect to each other. Transverse rows of rollers are rotatably mounted on the links to permit products to roll along the conveyor. The rollers are easily replaceable when necessary. The conveyor follows a downwardly extending spiral path comprising a series of inclined straight sections interconnected by inclined bend sections. Both the straight and bend sections are inclined so that parts roll along the conveyor path under the influence of gravity.

3 Claims, 11 Drawing Sheets

ROLLER CONVEYOR

CROSS-REFERENCES TO RELATED APPLICATIONS

This is a non-provisional application based on and claiming the filing priority of co-pending provisional patent application Ser. No. 60/580,948, filed Jun. 18, 2004, the disclosure of which is incorporated herein by reference.

BACKGROUND OF THE INVENTION

The present invention relates to a gravity feed roller conveyor and more particularly to a roller conveyor that accumulates or holds pallets or in a buffer zone immediately adjacent an end position where the products are used.

In conventional assembly operations, parts to be assembled are placed on pallets and then pallets are placed on conveyors leading to assembly stations where the parts are used. The length of conveyor upstream from the assembly location is deemed to be a "buffer" zone, wherein a supply of parts is maintained for use at the assembly point. In some operations, these buffer zones comprise a downwardly inclined conveyor that leads from an upper loading area downwardly in spiral fashion through a series of inclined straight sections, connected together by arcuate sections that extend through horizontal angles or bends of 30°, 45°, 90°, or 180°, until the parts reach the bottom of the conveyor, wherein the assembly station is located. Most such conveyors are driven conveyors, wherein a conveyor belt or conveyor chain for each conveyor section is driven by a motor and gears in an endless loop path, and adjacent sections of driven chain are positioned end to end with respect to each other. Where conveyors are driven around arcuate bends, it is conventional to use an articulating conveyor chain, wherein a plurality of longitudinally spaced links having arcuate adjoining edges are pivotally connected together so as to permit the chain to follow an arcuate horizontal path.

When the chain is used to provide a buffer zone in an accumulating conveyor (where the products stop but the chain keeps moving), the stopped products create drag on the moving chain. Low friction links reduce friction stress, but heavy products make friction a problem. To minimize this problem, a different type of drive chain, called "roller top chain" can be used. Roller top chain includes rollers mounted on the tops of the links, so that when the products are stopped, the conveyor can continue to move underneath the products, with the conveyor rollers rolling underneath the products as the links continue to move in an oval path under the products.

A serious problem with driven accumulating or buffer conveyors of this nature is that the weight of the products on the links causes a great deal of wear on the various moving mechanisms of the system, as well as on the drive components of the system. Replacement parts are expensive, and maintenance and repair of such systems involves a substantial amount of down time for the assembly line.

In driven systems of the type described above, it is conventional to position the straight sections of track at an inclined angle but to position the arcuate portions of the conveyor at the ends of the straight sections in a horizontal plane, with a rotatable horizontal bend wheel being on the inside of the bend. The horizontal orientation of the bend sections causes the products to stack up in the bend sections. This increases the load and wear on the system substantially.

An object of the present invention is to provide an improved accumulating conveyor system that can easily be used in existing conveyor systems without the maintenance problems and down time associated with conventional driven conveyor systems.

SUMMARY OF THE INVENTION

In accordance with the present invention, an improved accumulating conveyor that is especially useful in providing a parts buffer zone in an assembly operation comprises a gravity feed roller top conveyor for conveying parts or pallets along an inclined conveyor path to an end destination and for storing the parts on the conveyor until they are used. The conveyor includes a downwardly sloped conveyor support frame with a plurality of rollers rotatably mounted along the frame. The rollers comprise a length of roller top conveyor chain mounted along a top surface of the conveyor frame between sides thereof. The conveyor chain comprises a plurality of links connected together in a longitudinal direction by pivotal connectors that permit sideways articulation of the links with respect to each other. Desirably, the links and the rollers are easily removable and replaceable in the chain.

The present invention can use the conveyor frame in an existing driven chain system, as described above, but the frame is modified from the conveyor frame of prior buffer conveyor systems. In the present invention, the arcuate or bend portions of the conveyor frames, as well as the straight portions, are mounted at an inclined angle, so that there is a gradual downward incline throughout the entire length of the conveyor chain. An exemplary angle of inclination at a bend might be about 12°, but the angle can vary. The angle of inclination should be sufficient to move the product along the track under the influence of gravity without being so steep that the product gains too much speed and momentum. A feasible inclination range is between about 8° and about 25° or perhaps more under some circumstances. A preferred range is about 10° to about 20°. A more preferred range is about 12° to about 17°. A number of factors are taken into account to determine a proper inclination for a particular installation.

The use of fixed position, gravity feed roller top chain eliminates parts and maintenance problems and makes chain and rollers inexpensive and easy to replace. The elimination of the bend wheels and level portions at the arcuate ends of the straight sections causes the parts to ride smoothly along the entire length of the chain, and the parts are not stopped at the bends on the conveyor. This provides a more smooth delivery of products along the conveyor and eliminates malfunctions due to product stoppages on arcuate portions.

These and other features of the present invention will hereinafter appear, and for purposes of illustration but not of limitation, a preferred embodiment of the present invention is described below and shown in the appended drawings.

DETAILED DESCRIPTION OF THE INVENTION

Figure 1:
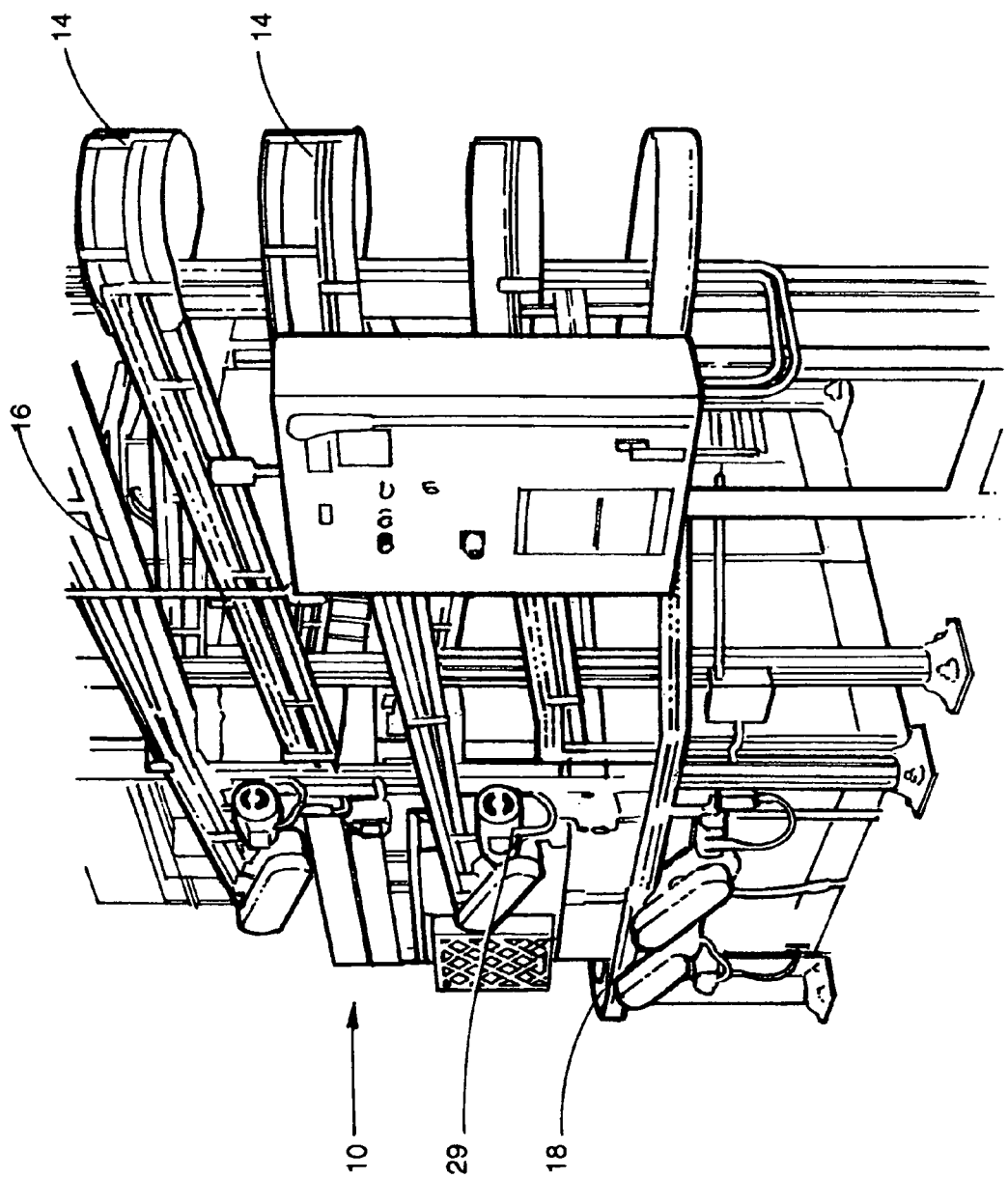
FIG. 1 is a perspective view of a prior art buffer conveyor employing horizontal bend wheels at corners of inclined conveyor sections.
Figure 2:
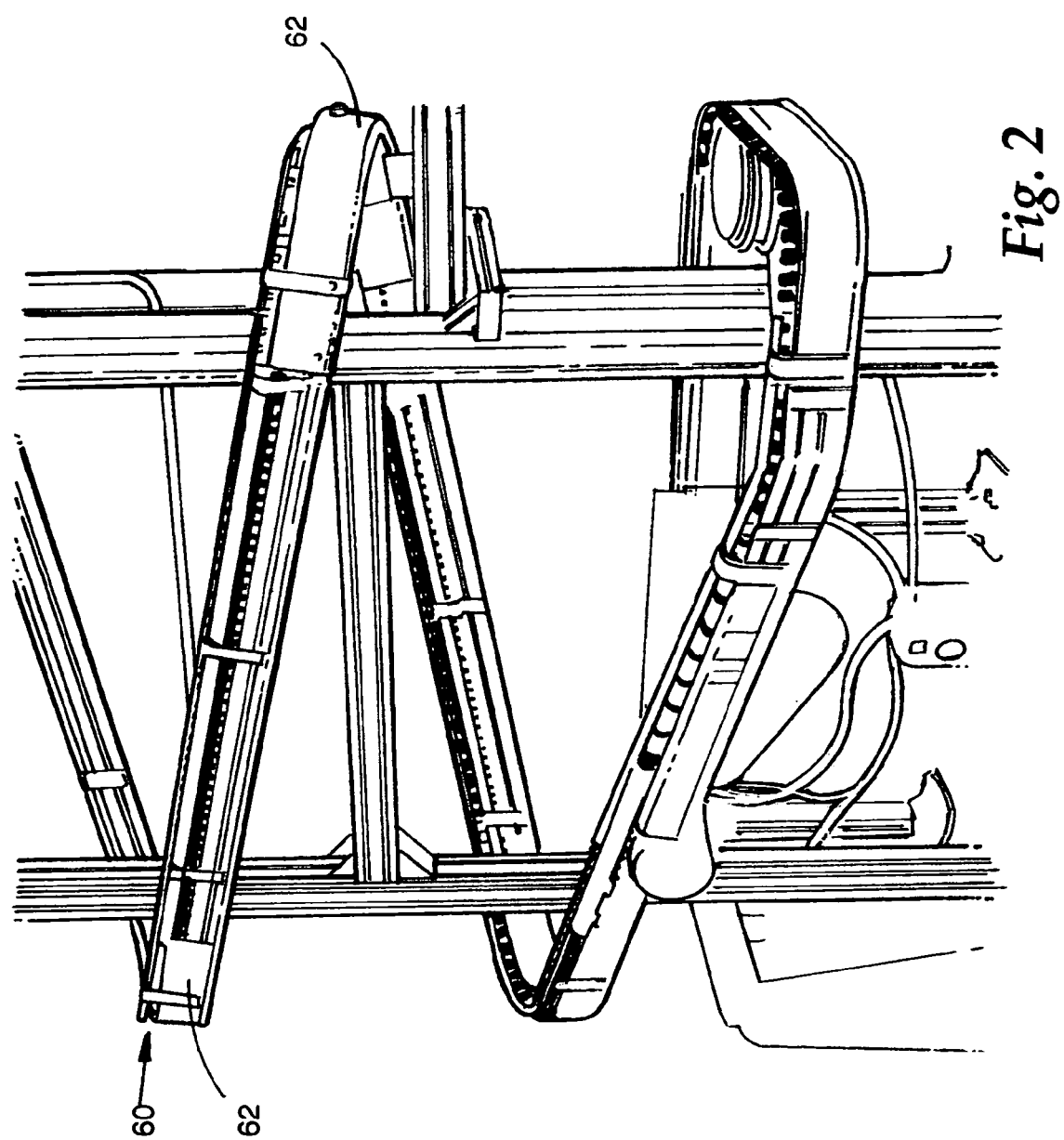
FIG. 2 is a perspective view of the conveyor mechanism of the present invention.
Figure 3:
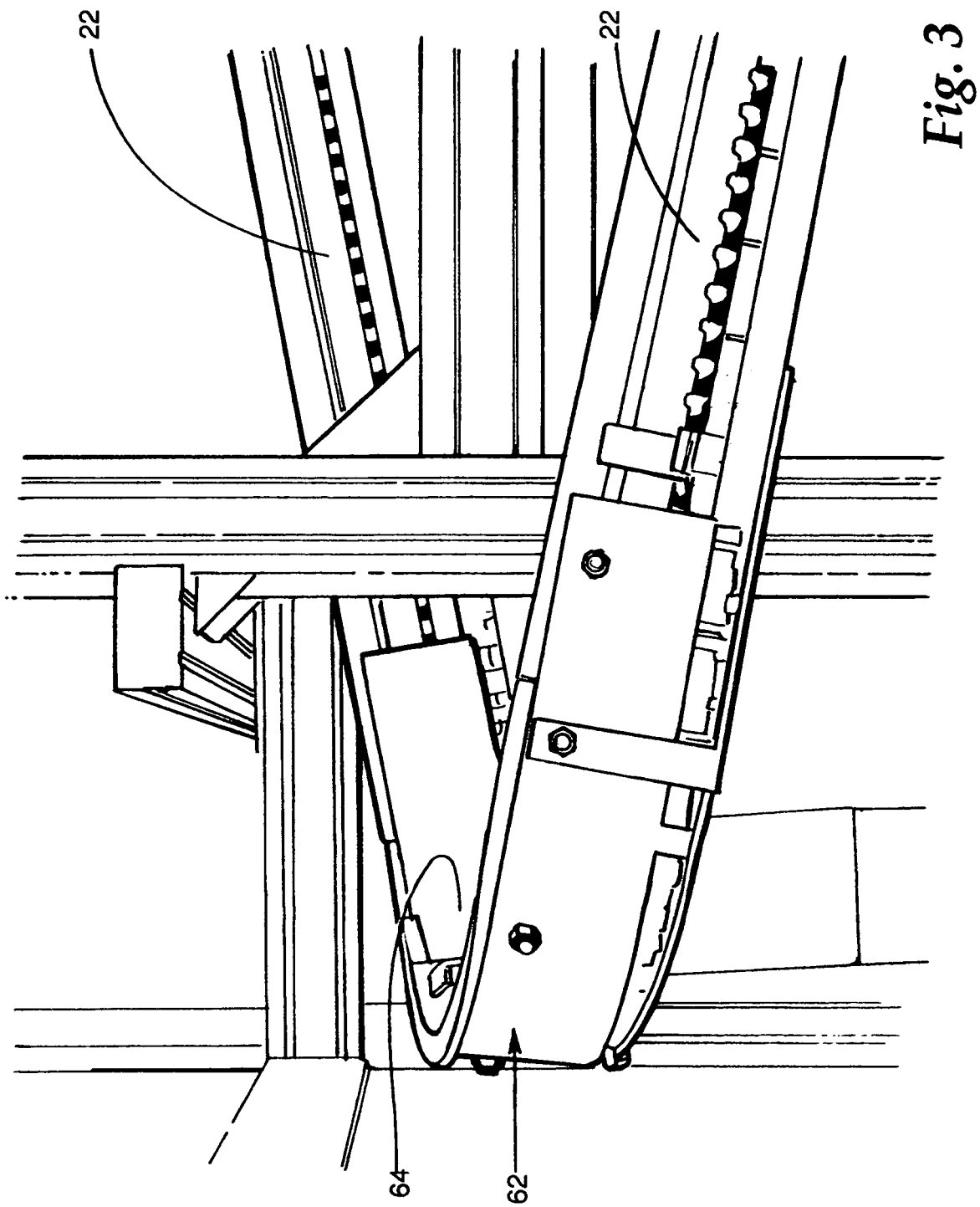
FIG. 3 is a side elevational view of an end section of the conveyor of the present invention.
Figure 4:
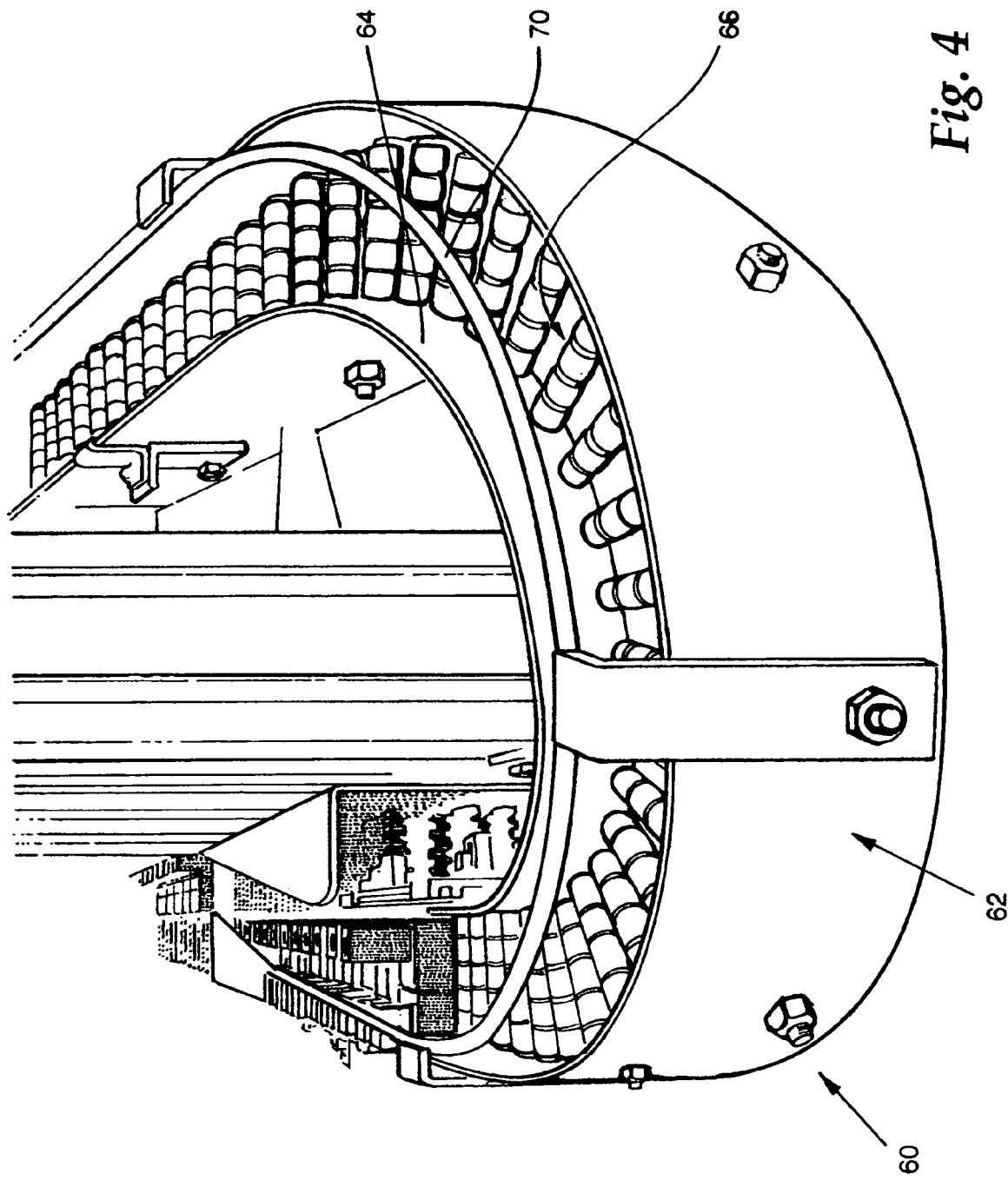
FIG. 4 is a perspective view of an end section of the conveyor of the present invention.
Figure 5:
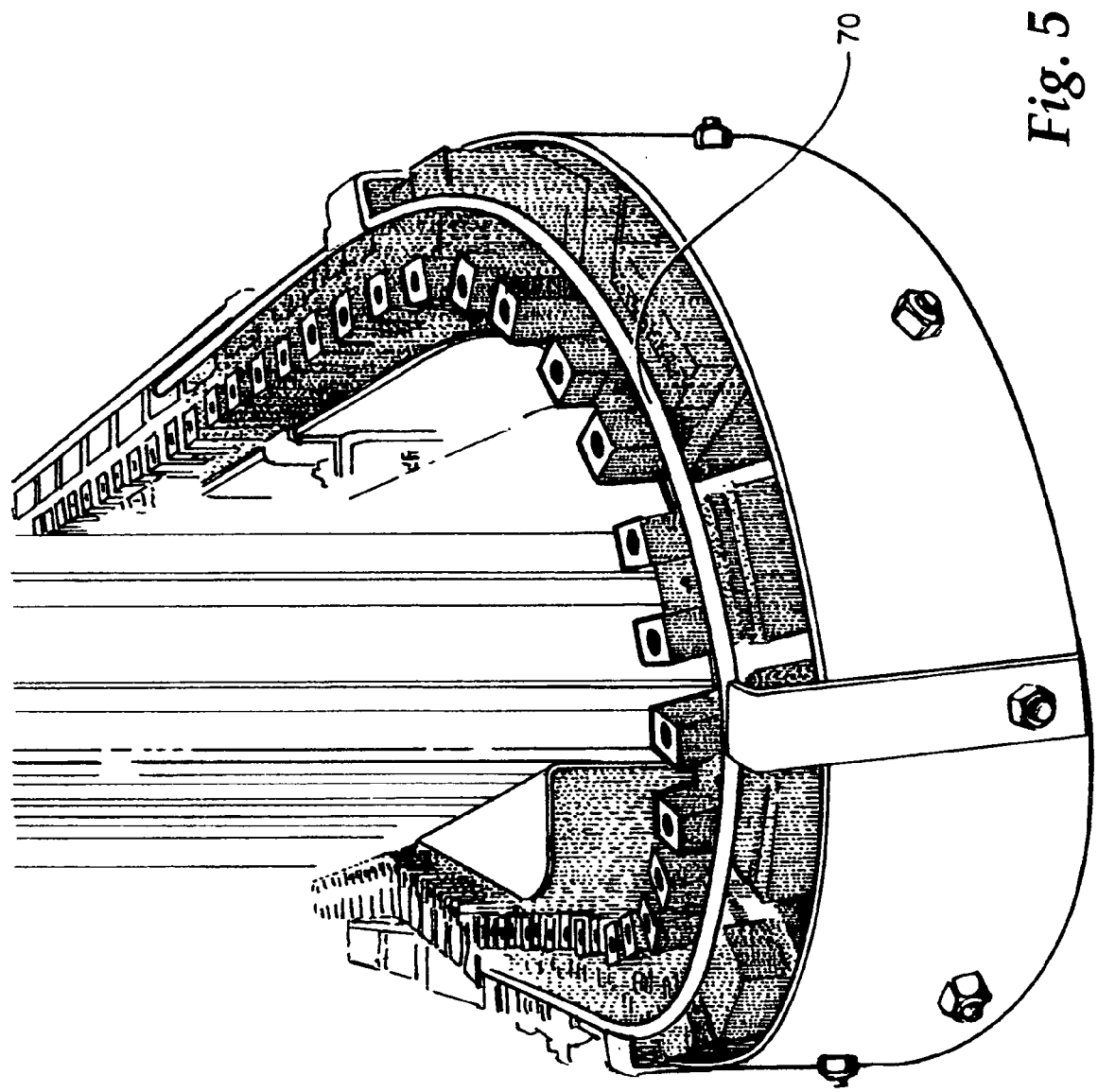
FIG. 5 is a perspective view similar to FIG. 4, showing a bend section of the conveyor of the present invention, with the conveyor loaded with products being conveyed.
Figure 6:
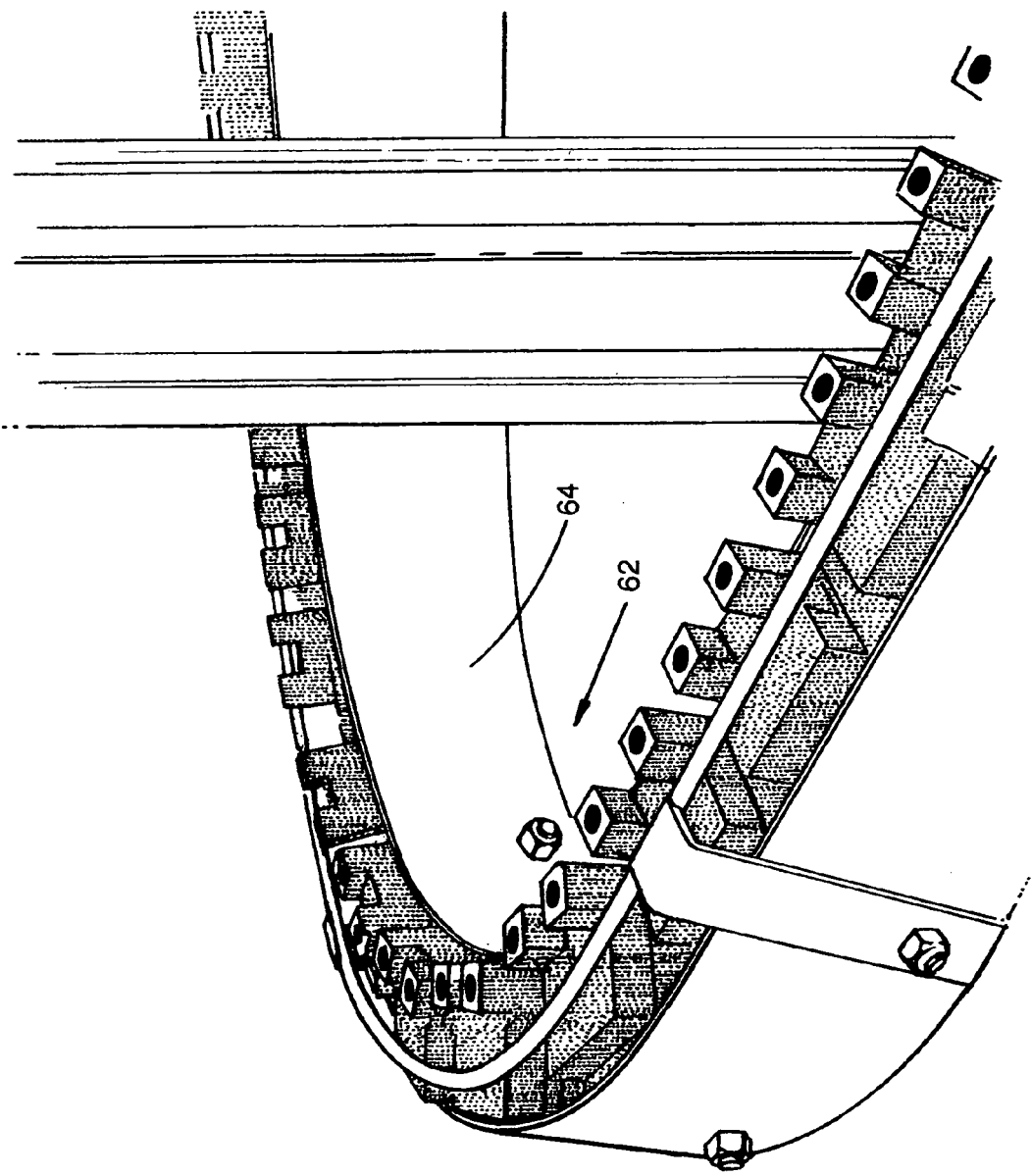
FIG. 6 is a perspective view of a bend section of the conveyor of the present invention, with the conveyor being loaded with products.
Figure 7:
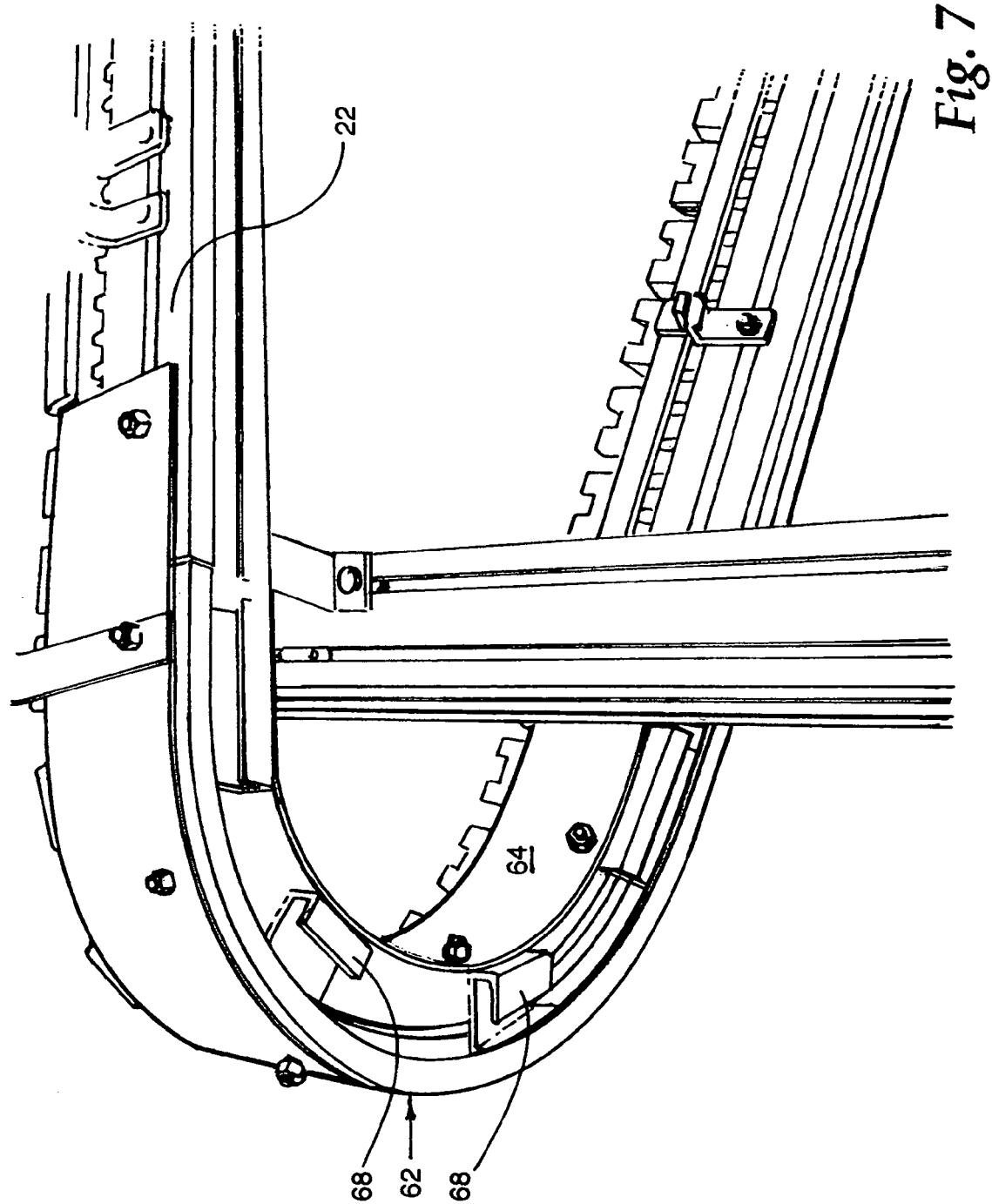
FIG. 7 is a perspective view of the underside of a bend section of the conveyor of the present invention.
Figure 8:
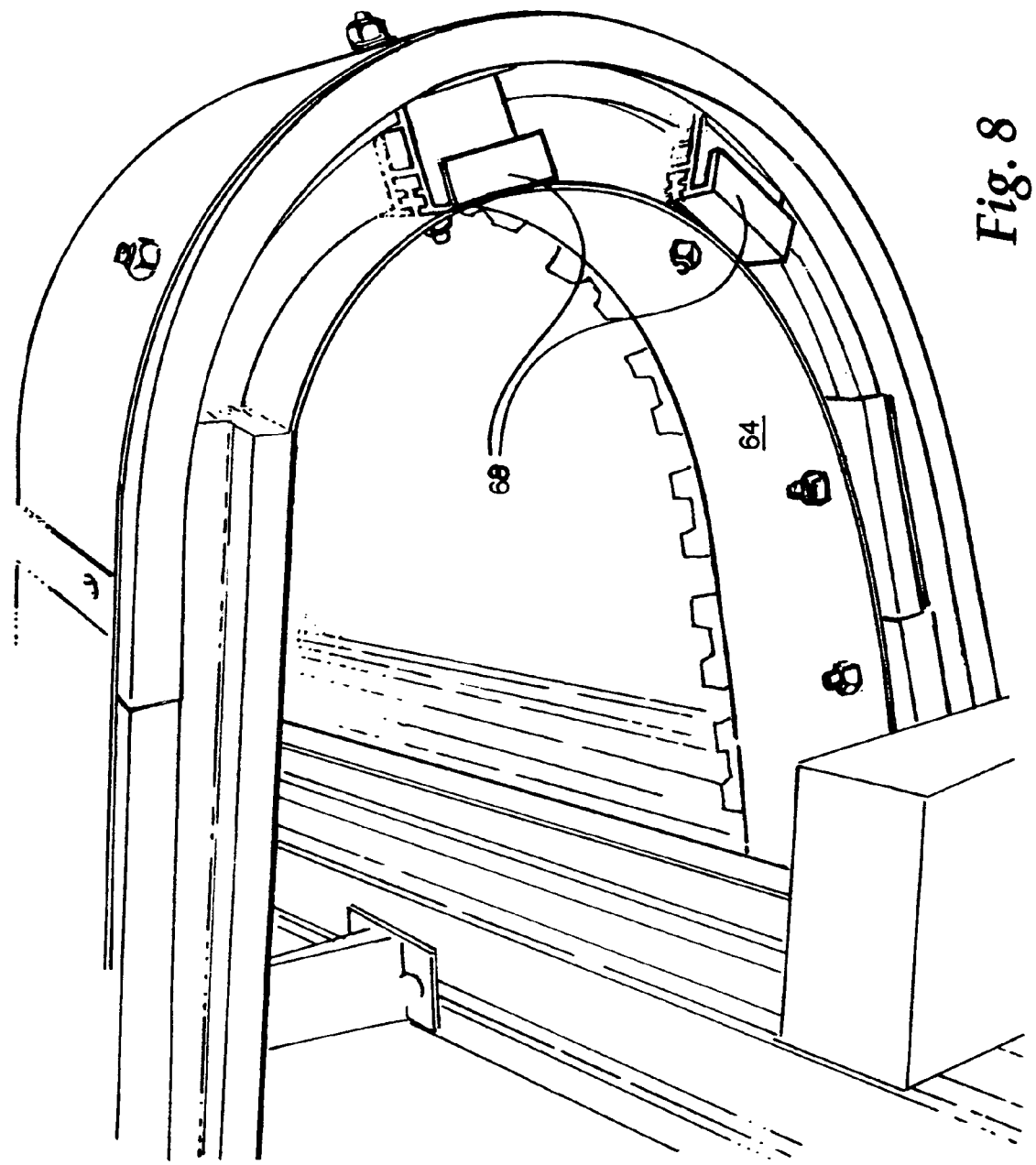
FIG. 8 is a perspective view of a bend section of the conveyor of the present invention.
Figure 9:
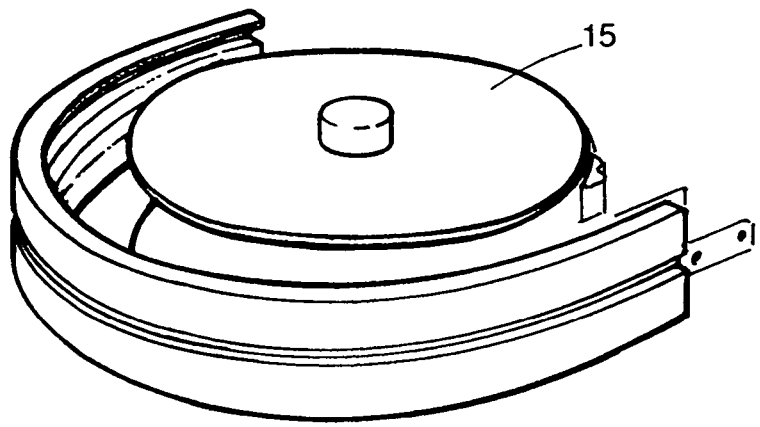
FIG. 9 is a perspective view of a prior art horizontal wheel bend mechanism.
Figure 11:
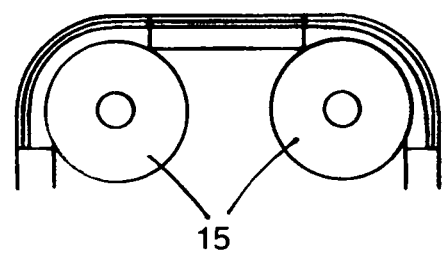
FIGS. 10-12 are schematic plan views of various configurations of the wheel bend mechanisms of the type shown in FIG. 9.
Figure 10:
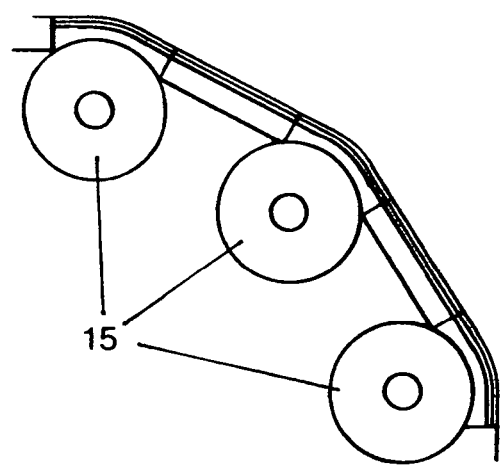
Figure 12:
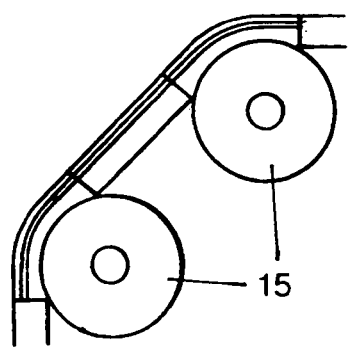

A buffer or accumulating conveyor system 10 of the type conventionally used prior to the present invention is shown in FIG. 1. Conveyor system 10 comprises a plurality of downwardly inclined straight conveyor sections 12 connected at their ends by horizontal arcuate or bend sections 14, leading in spiral fashion from an upper end 16 to a lower end 18, which is positioned adjacent a station where the products are used one at a time. The generally spiral arrangement of the system is designed to minimize space and provide a maximum amount of conveyor length for accumulating products prior to use in a manufacturing operation, such as an assembly operation.

Typical bend or arcuate sections are shown in FIGS. 9-12. These are called horizontal wheel bends, because the conveyor is guided around a bend by means of a horizontal wheel 15 mounted on the inner edge of the bend. The wheel is mounted on bearings and bears against the inner edge of the conveyor as the conveyor goes around the bend. This prevents the conveyor from rubbing against the inside edge of a stationary beam, which would increase friction and drag on the conveyor chain.

Figure 13:
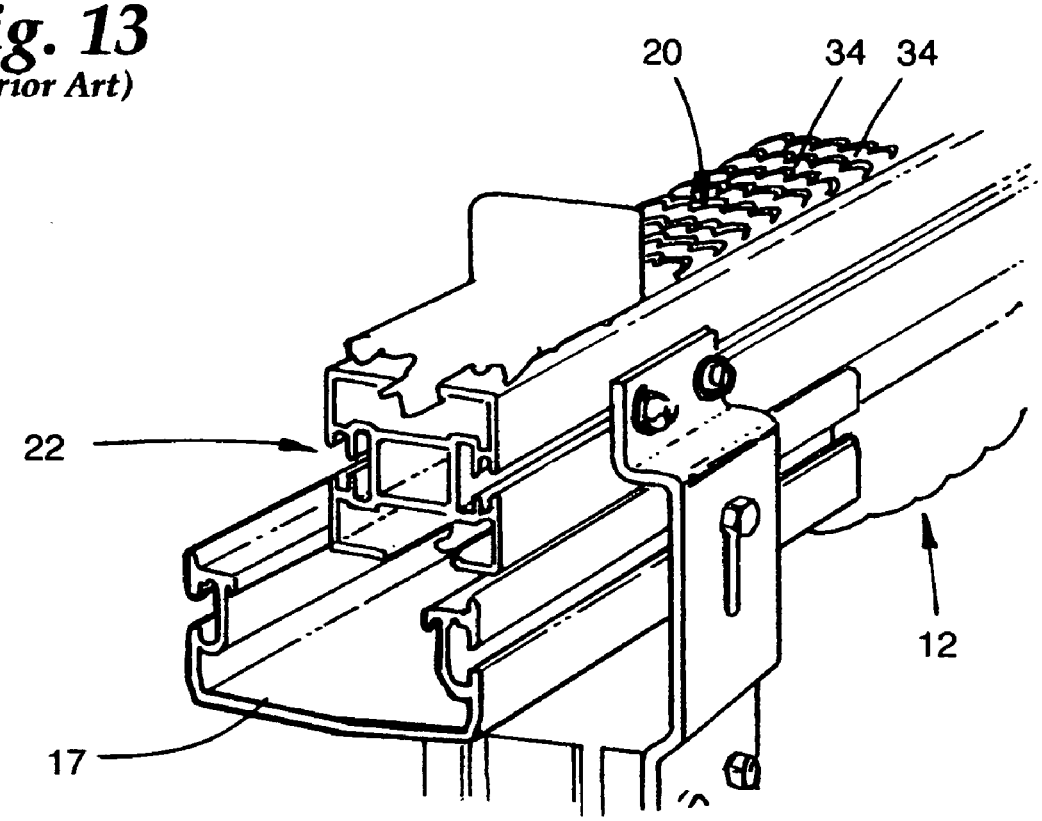
FIG. 13 is a perspective view of a straight, inclined section of conveyor of which the present invention constitutes an improvement.
Figure 14:
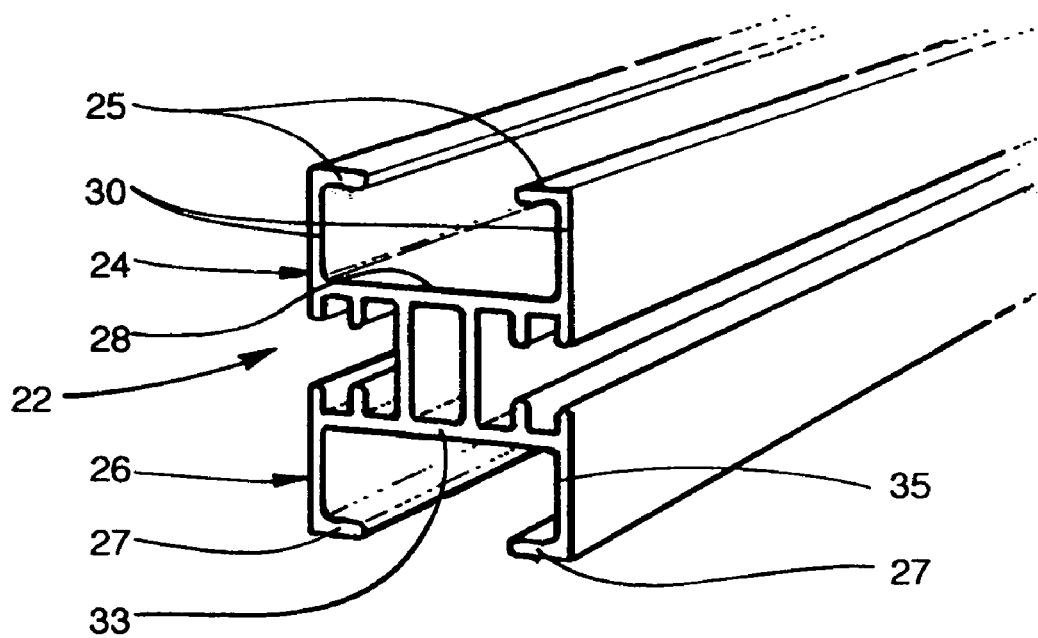
FIG. 14 is a perspective view showing the guide rail or conveyor beam of the present invention and the prior art and a cross sectional view thereof.

Inclined straight conveyor sections 12 are positioned on opposite sides of the bend sections. The conveyor sections include an articulating endless loop conveyor chain 20 that rides on a standard guide rail or conveyor beam 22 (FIGS. 13 and 14). A drip tray 17 can be included to catch liquids or lubrication that drips from the conveyor The conveyor chain on each section typically is formed in a continuous loop that is driven by a motor and gear mechanism 29, which is conventional. The conveyor chain rides on flanges 25 on upper section 24 of the guide rail or conveyor beam when moving in a forward direction and rides on flanges 27 on a lower section 26 while moving in a return direction. Upper section 24 includes a bottom 28 and sides 30 with inwardly extending flanges 25 at an upper edge of the sides. Lower section 26 has a top 33 and sides 35. In a conventional system, the inner side of the guide rail is removed at the corner section, so that the wheel 15 can engage the inner edge of the conveyor chain.

The conveyor chain 20 is conventional and includes a plurality of links that are pivotally attached together for relative movement about a vertical axis, so that the links can articulate in a sideways direction and bend around corners and the like as shown. These are called flexible links and are conventional.

The flexible links can be made of a number of materials but typically are made of a synthetic resin and attached together for articulating movement by stainless steel pivot pins. A single link can include several articulating pivot plates 34, each connected to a substrate or to each other by a vertical pivot pin. Each plate can have a serrated or convoluted outer edge that is preferably arcuate in shape and engages a similar convoluted or toothed outer edge of an adjacent plate, so that articulation of one plate causes articulation of an adjacent plate and the plates are maintained in relative positions with each other.

All of the foregoing is conventional. These products are available from a number of manufacturers, including a manufacturer known as Flex Link.

Figure 15:
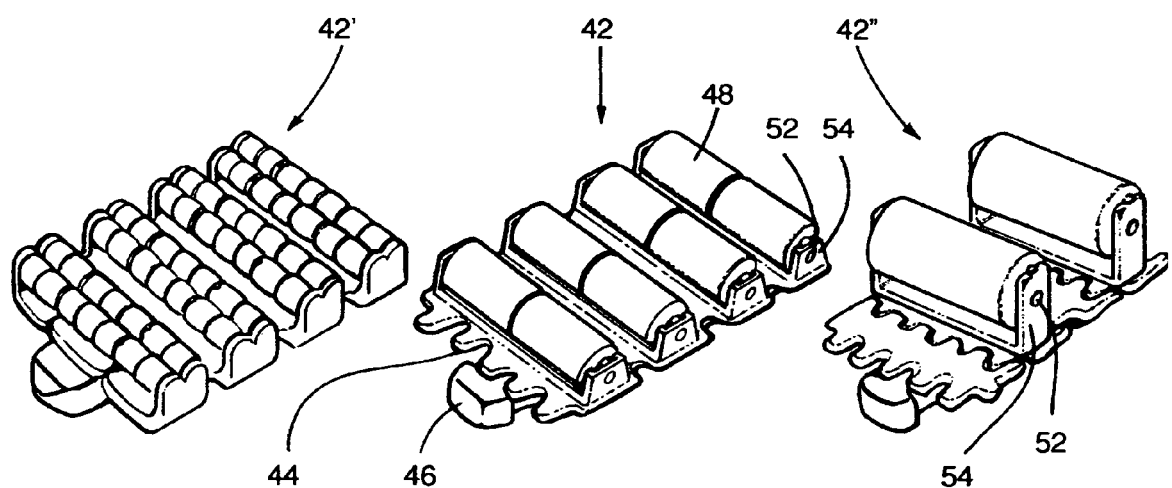
FIG. 15 is a perspective view showing three different types of roller conveyor links employed in the roller conveyor chain of the present invention.

In situations where a conveyor chain is used for a buffer in a manufacturing operation, wherein products are stopped adjacent a use station until the products are used, a modified type of chain known as a roller top conveyor chain 40 can be used. Three of many different styles of links 42, 42', and 42" for a roller top chain are shown in FIG. 15. In a roller top chain, the individual links 42 include, as previously described, a plurality of interfitting plates having arcuate edges 44, with the individual links being connected by a projection 46 at one end that engages a receptacle (not shown) in the opposite end of the adjacent link.

In a roller top chain, a plurality of rollers 48 are mounted at spaced longitudinal intervals on the tops of the links. The rollers include one or more cylindrical rollers mounted on axle shafts 52, which are journaled in upstanding flanges 54 on the tops of the links. These flanges and the axles may be mounted so that the axles can be removed easily by deflecting the flanges outwardly, for replacement of the rollers or the like. Also, the individual links of the conveyor chain can be replaced as necessary.

In a conventional roller chain application, the roller chain is driven and, under ordinary circumstances, carries the conveyed product on top of the roller without the roller rotation. However, if the product is stopped at any point, the conveyor chain can continue to move and the links will roll under the stopped products, minimizing friction between the moving conveyor chain and the stopped products. Where the products are light, it is possible to eliminate the roller chain and simply use a low friction upper surface on the chain links so that there is minimum friction between the products and the moving chain.

An improved conveyor mechanism 60 of the present invention is shown in FIGS. 2-8. Conveyor mechanism 60 employs most of the components in the conventional conveyor system and thus does not involve new or unusual conveyor mechanisms and, more importantly, does not require a complete change of conveyor track and conveyor chain in order to retrofit an existing system to the improved system of the present invention. In the present invention, all drive mechanisms are completely eliminated, and a simplified and inexpensive gravity feed roller conveyor is used. The present invention will be described in the context of a retrofit or modification of the prior system described above, although it should be understood that the present invention can be installed as a new system as well.

In modifying an existing buffer system of the type described above in order to accommodate the present invention, the first change is that all of the drive units that have caused such continuing maintenance problems are eliminated. Then, the bend sections are changed. Instead of employing rotatable wheels on an inner edge of a horizontal bend section, the wheels are eliminated and the bend sections are modified so that the modified bend sections 62 maintain a downwardly inclined slope throughout the bend section. Existing track sections can be modified to incorporate a slope and a bend. If an existing track section is used, the opening where the wheel was removed is replaced by an arcuate plate 64 on the inner side of the conveyor rail. New sections of conveyor rail 68 (which can be sections of straight conveyor rail 22) having horizontal flanges at inner sides of the rail also can be mounted on the bend sections to provide support for the inner side of the conveyor around the curve.

With the rail thus modified, the rail has a continuously downwardly sloped bottom surface providing a continuously downwardly sloped conveyor path between the upper end and lower end of the conveyor.

The conveyor path is then covered with a roller conveyor chain 66 formed from the roller conveyor chain described above, except that the roller conveyor chain is not movable and covers only the upper side of the conveyor rail. One or more sections or links of conveyor chain are positioned end to end in the conveyor path so as to create a roller conveyor extending from the upper end to the lower end of the conveyor. By using the articulating roller chain described above, the roller chain can go around arcuate sections as it did previously. The roller chain, however, does not rotate but is maintained in a fixed position. This can be accomplished by simply attaching each end of the roller chain securely in place to the conveyor rail. No other connections need be made, and importantly, it is not necessary to mount individual rollers to the sidewalls of the conveyor frame. The rollers thus serve as a prefabricated, modular roller conveyor system that mounts simply and easily in the conventional conveyor rail.

By using conventional flexible link conveyor chain, the conveyor chain is readily available and relatively inexpensive. Moreover, the modular nature of the system permits removal and replacement of rollers and links as necessary when they wear out or are damaged or otherwise require service. In the event that an entire length of roller chain needs to be replaced, a minimum number of fasteners, perhaps as few as two, can be released to permit the removal and replacement of an entire length of chain.

The slope of the inclined and bend sections of the track is adjusted, as necessary, to provide sufficient incline that the products move along the track under the influence of gravity from the upper end to the lower end of the conveyor. The slope of the track is restricted to an incline that prevents products from gaining too much momentum as they roll along the track between the upper end and the lower end. A number of factors are taken into account in designing a particular incline for a particular product line.

Because the present invention involves a continuous down slope and does not have the horizontal dead areas at the bends, as in the prior systems, a guide rail is positioned at each bend section of the system. Guide rail 70 is attached to the outer side of the conveyor at the bend and includes a longitudinal rail that is positioned at an elevation slightly above the top of the products being conveyed and somewhat inboard of the outer edge of the conveyor. Thus, the guide rail is positioned above the products as they are traversing through the bend sections. If the momentum of the products is such that they are inclined to fly off the track as the products are sliding through a bend, the guide rail holds the products down on the track. This prevents the products from tipping upwardly and outwardly on an outer edge and also prevents the products from sliding up on the guide plate. The guide rail position is adjustable for different products.

The present invention provides a simple and effective method for conveying parts (or pallets) along a desired path on a conveyor. Conventional conveyor guide rails can be employed, and a conventional roller top chain used with the guide rails can be employed. All that is necessary to change is the fact that the roller top chain is fixed in position instead of being rotated in a continuous loop by a motor and drive mechanism. This makes it possible to design a new conveyor system or retrofit an existing conveyor system with existing, proven, and readily available components that have been shown to work together, while at the same time eliminating virtually all problem areas and all of the expense and maintenance required of a driven system. Long term testing of the present invention has shown that the components hold up and provide much greater reliability and much less expense than prior systems.

It should be understood that the foregoing is merely exemplary of the present invention and that various modifications in the arrangements and details of construction of the embodiments disclosed herein may be made without departing from the spirit and scope of the present invention.

We claim:

1. A method for providing an inclined roller conveyor comprising:

providing an inclined roller conveyor frame, the frame having a substantially continuously inclined bottom surface, spaced sides, and an open top; and providing a length of prefabricated roller top conveyor chain along a conveyor path on the frame bottom surface and fastening the conveyor chain in a fixed position on the frame, the roller top conveyor chain comprising a plurality of sideways articulating links connected together end to end, with the links comprising one or more generally flat plates of the type that are designed to engage and slide along a conveyor path in the manner of an endless loon conveyor chain or conveyor belt, the plates extending laterally from one side of the chain to the other side of the chain in abutting relationship with the bottom surface of the frame, the links having laterally spaced flanges extending upwardly from opposite sides of at least one plate in the link, rollers being rotatably suspended between the flanges in position to rotatably support products mounted thereon, the links and attached rollers being individually replaceable for repair or replacement.

2. A method as in claim 1 wherein the flat plates and flanges of the links extending therefrom are integrally formed from a moldable synthetic resin, the links comprising a plurality of flat plates pivotally connected together, the links having arcuate interfitting surfaces on ends thereof that permit sideways articulation of the links with respect to each other so that the conveyor frame can follow an arcuate path, the conveyor chain fitting between the spaced sides 5f the frame and resting on the bottom of the frame, the conveyor chain being installable and removable in prefabricated multi-link lengths by attaching at least some of the links of the chain to the frame, the rollers being mounted on and supported by the links and not requiting individual attachment to the frame.

3. A process for modifying an accumulating conveyor wherein a plurality of inclined conveyor sections, employing motor powered endless loop conveyor chains, are connected together by horizontal bend sections having rotatable bend wheels at an inner edge, the process including:

eliminating the motor drives for conveyors;

replacing the endless loop conveyor chain with a single layer of prefabricated roller top conveyor chain having flexible links, the conveyor chain being mounted in a fixed position on pre-existing conveyor rails, the rollers on the conveyor chain serving as an inclined gravity feed roller conveyor;

removing the bend wheel on the inner periphery of the bend section and replacing it with a fixed plate at the inner periphery of the bend section, and providing support for the conveyor chain around the inner periphery of the bend section;

bending the bend sections such that the bend sections provide downwardly inclined conveyor support rails throughout the bend sections; and providing a layer of fixed position articulating roller conveyor on the bend sections of the conveyor, such that products will roll on the inclined roller conveyor under the influence of gravity alone from the top to the bottom of the conveyor.

\* \* \* \* \*